March 17, 1964  F. P. DEVINE  3,124,966

MOTION TRANSMITTING MEANS

Filed Aug. 1, 1960  2 Sheets-Sheet 1

INVENTOR.
FRANCIS P. DEVINE,

BY Allen + Allen

ATTORNEYS.

March 17, 1964  F. P. DEVINE  3,124,966
MOTION TRANSMITTING MEANS
Filed Aug. 1, 1960  2 Sheets-Sheet 2
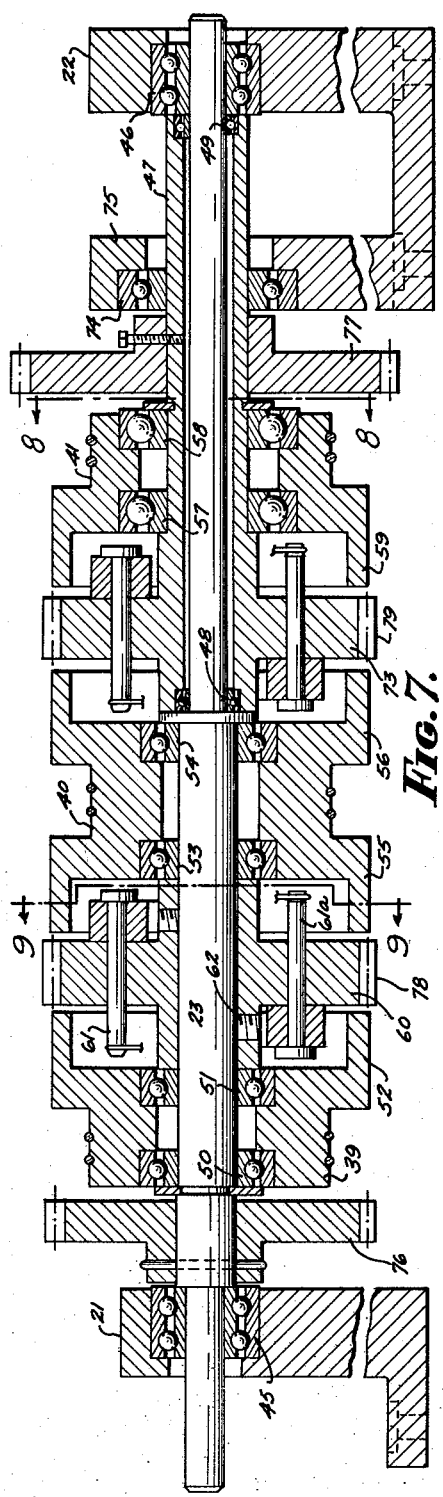
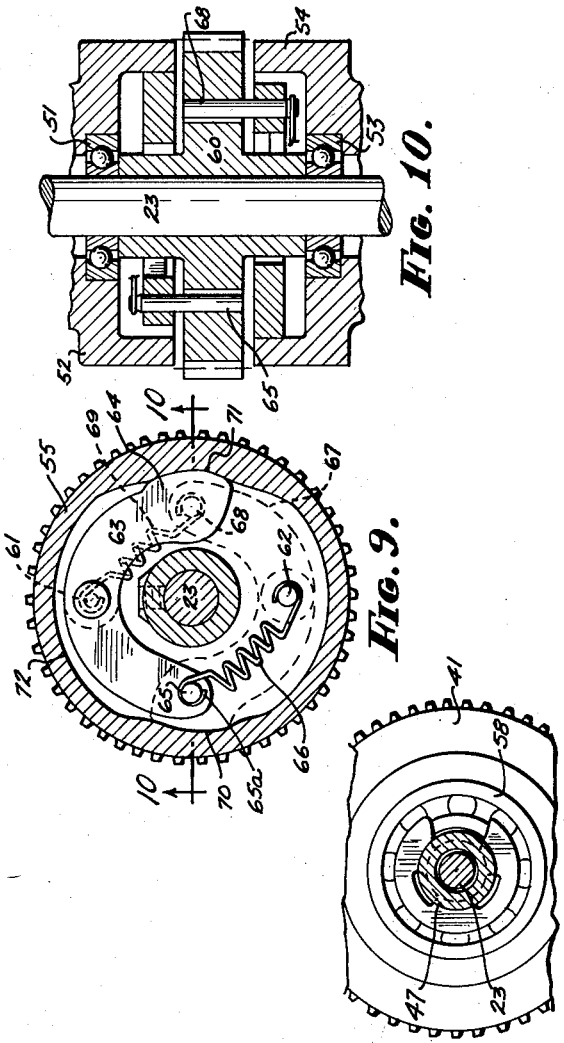
INVENTOR.
FRANCIS P. DEVINE,
BY
Allen + Allen
ATTORNEYS.

United States Patent Office 3,124,966
Patented Mar. 17, 1964

3,124,966
MOTION TRANSMITTING MEANS
Francis P. Devine, Buena Park, Calif., assignor to Avco Corporation, Cincinnati, Ohio, a corporation of Delaware
Filed Aug. 1, 1960, Ser. No. 46,814
2 Claims. (Cl. 74—136)

The invention relates to motion transmitting means in the nature of drives, the drive in most instances serving to change the mode of motion as will hereinafter be set forth. The field of utility of the apparatus is wide. Since the apparatus is one particularly designed to transmit motion without back-lash, it will be evident that the invention may be used wherever the accurately controlled movement of an element is desired. Without limitation, it may be stated that the invention is useful for scanning purposes, and in particular, for controlling and indicating the movements of radar antennas and the like.

It is the primary object of the invention to transmit motion from one accurately controlled moving member to another, without loss of accuracy.

It is the object of the invention to provide means whereby rotary motion may be converted to oscillatory motion and vice versa.

It is the object of the invention to provide means for converting oscillatory motion of one element through a certain angularity to oscillatory motion of another element or elements through the same or a different angularity, all with extreme accuracy and without lost motion.

Figure 3:
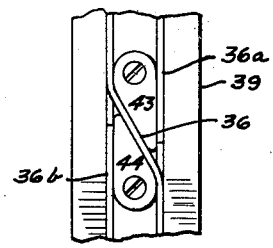
Figure 1:
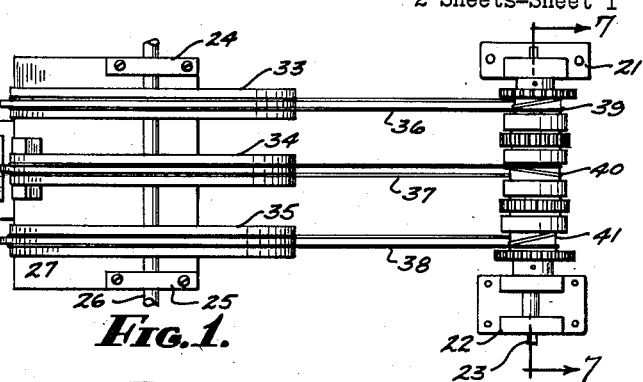
Figure 2:
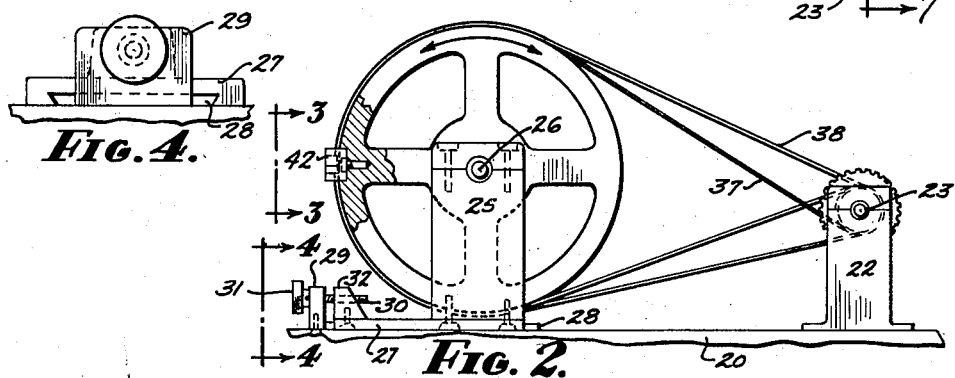
Figure 5:
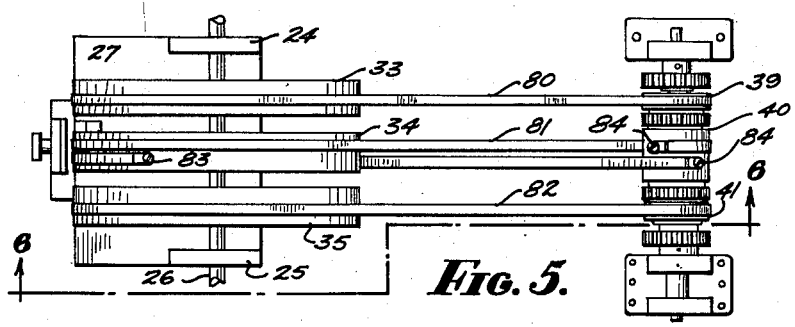
Figure 6:
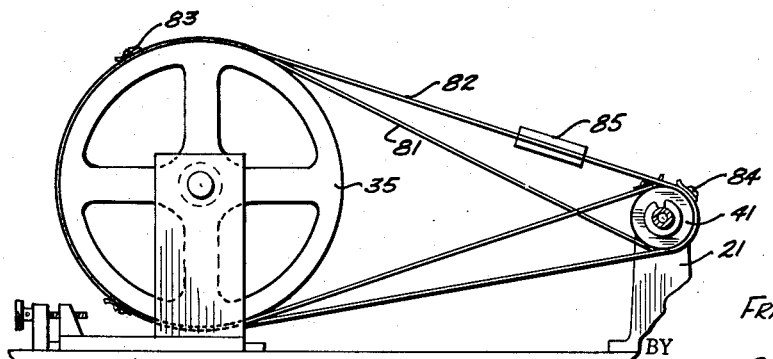

This and other objects of the invention which will be set forth hereinafter, or will be understood by the skilled worker in the art upon reading these specifications, are accomplished by that combination and arrangement of parts of which certain exemplary embodiments will now be described. Reference is made to the accompanying drawings where:

FIG. 1 is a plan view of one form of the apparatus;
FIG. 2 is a side elevational view thereof;
FIG. 3 is a partial plan view showing a mode of fastening a cable to a wheel;
FIG. 4 is a partial end elevational view of the structure shown in FIG. 1;
FIG. 5 is a plan view of a modified form of the apparatus including metallic bands;
FIG. 6 is a side elevational view thereof with parts in section, the section being taken along the line 6—6 of FIG. 5;
FIG. 7 is a sectional view taken along the line 7—7 of FIG. 1;
FIG. 8 is a transversed sectional view taken along the line 8—8 of FIG. 7;
FIG. 9 is a transverse sectional view taken along the line 9—9 of FIG. 7;
FIG. 10 is a partial longitudinal sectional view taken along the line 10—10 in FIG. 9.

In the practice of the invention, two members are related as driving and driven means, although in various embodiments of the invention the driving and driven functions may be interchangeable. The members bear pulleys, wheels, or drum-like surfaces which are connected together by bands, belts or other driving means. The bands are preferably of metal and are fastened or locked to the wheel or wheels of one of the elements, and may be locked to the wheels or drum surfaces of the other of the elements, where both elements are to have an oscillatory movement. Metals are chosen for the driving and driven members, for the wheels, pulleys, or drum surfaces, and for the bearing housings in such a way as to attain an equilibrium condition despite varying ambient temperatures.

Provision may be made to tighten the drives as may be required. In some instances the mechanism is employed to convert an oscillatory movement of one element through a given angularity to an oscillatory movement of another element through a different angularity. In other forms of the apparatus, a continuous rotary motion may be converted to an oscillatory motion, or an oscillatory motion converted to a continuous rotary motion.

The nature of the oscillatory movements can be substantiallly varied, i.e. the mode of oscillatory motion may be sinusoidal or otherwise. In general, the mechanism of this invention transmits movement without lost motion or back-lash, and thus avoids the disadvantages of gears and other functional motion transmitting means. Also, as apparent later in the description, the motion-conversion aspects of the invention eliminate the use of Geneva mechanisms, scotch yoke devices and the like, for obtaining intermittent and sinusoidal motion. The mechanisms of this invention operate with extreme accuracy, effect a saving of space and weight, and virtually eliminate the problems of lubrication. Wear and noise are also reduced or eliminated.

An exemplary form of the invention is illustrated in FIGURES 1 and 2.

On a suitable base 20, bearing stands 21 and 22 are mounted for a shaft 23. At a spaced position there are bearing stands 24 and 25 for a shaft 26. Preferably bearing stands 24 and 25 are mounted on a sub-base 27 which is movable and mounted on the base 20 by a dove tailed slide 28. An adjusting means is indicated as comprising bracket 29 mounted on the base 20, and journaling a threaded shaft 30 having an operating means 31. The threaded portion of the shaft 30 engages in a threaded opening in a bracket 32 on the sub-base 27. While this showing is diagrammatic it will be understood to indicate means whereby drives between shaft 26 and shaft 23 may be tightened or tensioned as required.

Shaft 26 carries three wheels or pulleys, 33, 34, and 35 in the exemplary embodiment. These wheels or pulleys are connected by cable drives 36, 37, and 38 to pulleys 39, 40 and 41, mounted in connection with the shaft 23 in a manner which will hereinafter be described. The pulleys or wheels 33, 34, and 35 are preferably grooved to receive the cable; and end portions of the cables are fastened to the surfaces of the wheels by clamping means indicated in FIG. 2 at 42. This clamping means may also provide tension adjustment, so as to complement or replace items 27 through 32. In the particular embodiment the shaft 26 is intended to have an oscillatory movement as indicated by the arrow in FIG. 2.

The belts may pass twice about the surfaces of the pulleys 39, 40 and 41 which may be grooved to accept them. In many instances, it is desired to anchor the belts with respect to these pulleys, also. One way of doing this is shown in FIG. 3 where a pulley is partially indicated at 39 and is grooved to receive the belts. At a suitable position on the face of the pulley two wedges 43 and 44 are provided, the belt 36 passing between them in a clamping relationship, and ends 36(a) and 36(b) of the belt being clamped between the members 43 and 44 and side edges of the grooves. It may be noted in FIG. 1 that the two flights of the several belt drives 36, 37 and 38 are kept apart so that they do not rub against each other.

It will also be noted that by reason of the differences in diameter between the pulleys or wheels 33, 34 and 35 on the one hand and the pulleys 39, 40 and 41 on the other hand, the oscillatory motion of the wheels 33, 34 and 35 will be through a lesser angularity than the oscillatory motion of the pulleys 39, 40 and 41. The central belt drive 37 will be seen in FIG. 2 to be crossed so that the pulley 40 will be driven oppositely to the pulleys 39 and 41.

The nature of the assembly at the right hand end of FIG. 1 will best be appreciated from a consideration of FIGS. 7 to 10 inclusive. Here the bearing stands for the shaft 23 are again shown at 21 and 22. The shaft may be mounted in these bearing stands by means of ball bearings 45 and 46 or other anti-friction means. The right hand end of the shaft 23 is somewhat reduced in diameter and carries a sleeve 47 which is rotatably mounted upon it as by means of ball bearings 48 and 49. The pulley 39 is rotatably mounted on the shaft 23 by means of bearings 50 and 51 as shown. The pulley has a cup shaped extension 52 which will hereinafter be more fully described. The intermediate pulley 40 is rotatably mounted on the shaft 23 by means of ball bearings 53 and 54; and it has cup shaped extensions at either end marked respectively 55 and 56. The pulley 41 is rotatably mounted by means of ball bearings or the like 57 and 58 on the sleeve 47; and it has a cup shaped extension marked 59.

Within the several cup shaped extensions there are clutch-like means for connecting the pulleys to the shaft 23 or to the sleeve 47 as the case may be. One of these clutch-like means is shown in FIGS. 7, 9 and 10 as comprising a disc-like body member 60. This body member is perforated for the passage of certain posts 61 and 61a which lie diametrically opposite each other. The disc-like element 60 is shown as non-rotatably fastened to the shaft 23 as at 62.

A U-shaped clutch element 63 is shown as pivotally mounted on one side of the disc by means of the post 61. At one end this clutch member bears a shoe 64. At its other end it carries a pin 65 which is connected by a tensional coiled spring 66 to an end of the post 61a. It will be seen that the action of the spring is to hold the shoe 64 in contact with the inside surface of the cup shaped extension 55 on the pulley 40 at 71.

On the other side of the disc-shaped element 60 a similar clutch element 67 is mounted on post 61a. It carries a pin 68 connected by a spring 69 to the post 61. The clutch element 67 engages the inside surface of the cup shaped extension 52 on the pulley 39 at 70.

In the particular embodiment the inside surfaces of the cup shaped elements 52, 55, 56 and 59 are configured as best illustrated in FIG. 9. At diametrically opposite portions there are shallow indentations indicated at 70 and 71. The shoe 64 is shown as seated in one of these indentations. The engagement is frictional; but the indentation helps to maintain the frictional contact to the extent that the rotation of the disc-like element 60 will drive the cup shaped extension 55 since 64 is an integral part of 63 which is attached to 60 by pin 61, and since the bond between the cup shaped extension at points 70 and/or 71 would tend to increase due to the tendency of 63 to rotate counterclockwise about pin 61. Then, because the clutch element 63 is capable of pivotable movement on the post 61, the shoe 64 can come out of the indentation 71 when the motion of either 60 or 52 is reversed. Between the indentations 70 and 71 the inner surface of the cup shaped member 55 is cut back as shown at 72 so that the shoe 64 will not contact it. This is facilitated by limiting slots cut into the disc 60 at 65a. Under these circumstances, the clutch element 63 will not drive the cup shaped extension 55 until there has been sufficient relative rotation to enable the shoe 64 to enter the indentation 70.

The assembly includes another disc shaped element 73 which is affixed to or forms a part of the sleeve 47. There are clutching arrangements on both sides of the element 73 exactly similar to those which have been described in connection with FIG. 9, so that they need not here be outlined. While one form of clutching arrangement constituting essentially a self-releasing clutch has been above described, it will be understood that other forms of clutching arrangements may be employed. Clutching arrangements which are not self-releasing, but which are supplied with external actuating means, do not violate the principles of the invention. The external releasing means may be operated in timed sequence to the movements of the elements hereinabove described. It may be noted in FIG. 7 also, that sleeve 47 may have a separate ball bearing or other journaling means 74 in a bearing stand 75 adjacent to stand 22.

There are various ways in which the apparatus shown in FIGS. 1, 2 and 7 to 10 inclusive can operate. For example, it is capable of converting rotary motion into oscillatory motion. Suppose that shaft 26 is driven by a prime mover, causing pulleys 33, 34 and 35 which are firmly attached thereto, to oscillate. The members 36, 37 and 38, being firmly attached to pulleys 33, 34 and 35, will cause pulleys 39, 40 and 41 to oscillate at some discrete angle, the magnitude of which is directly proportional to the ratio of diameters of the two sets of pulleys.

If the clutch housed in the cup shaped element 52 of the pulley 39 is in engagement, the rotation of the pulley 39 will drive the shaft 23 in one direction. If, then, at the same time the clutch which is contained within the cup shaped extension 56 is in engagement, the tubular shaft 47 will rotate an equal and opposite amount. This is so because member 37 is cross-mounted between pulleys 34 and 40 as compared to member 38 mounted between pulleys 35 and 41.

At the same point of time, the clutch housed in the cup shaped extension 55 is disengaged, and this is also true of the clutch housed in the cup shaped extension 59.

To be consistent with FIG. 9, we may assume that any clutch shoe 64 will be engaged every alternate 180° of rotation. This being the case, we have now succeeded in rotating shaft 23 180° in one direction while at the same time shaft 47 has rotated 180° in the opposite direction, which is then one-half cycle of oscillation of shaft 26.

Suppose then that the clutch mechanisms that previously engaged the cup shaped elements 52 on pulley 39, and 56 on pulley 40 are now disengaged, as will be fully explained below, and the clutches housed in element 55 and in element 59 are now engaged. At this point in the cycle, if shaft 26 is oscillated back to its starting position, the member 37 will rotate pulley 40 and, therefore, shaft 23 through an additional 180°. At the same time, member 36 will rotate pulley 39 and, therefore, shaft 47 through an additional 180°.

From the foregoing it is now obvious that the shafts 23 and 47 have rotated through 360° while shaft 26 has completed an oscillating cycle.

It may be noted at this point that if it is desired to obtain intermittent motion or, in this analysis, 180° rotation of shafts 23 and 47, it is merely necessary to prevent the clutches housed in elements 59 and 55 from engaging.

Suppose that continuous rotary motion is applied to shaft 23 in one direction while continuous motion in an opposite direction is imparted to shaft 47. The device can then be used as a differential mechanism, used to measure a phase angle difference between two elements in a system. It is then possible to impart oscillating motion of a complete cycle or an intermittent motion cycle to shaft 26. This can be readily understood by considering the conevrse of the analysis given above for converting oscillating motion to continuous motion.

Although other forms of clutching may be employed, such as externally pulsed mechanical or electro-mechanical clutches, the one used here is self-contained and actuated by the relative motion between the clutch discs 60 and 73 and the pulleys 39, 40 and 41.

The elements 60 and 73 have been shown as carrying gear teeth 78 and 79 indicative of the fact that power may be directly applied to or derived from these elements, if desired.

In FIGS. 5 and 6 an organization of parts is shown in which like index numerals have been applied to like elements. The chief difference here is that instead of belts or cables, metallic bands have been shown for the drives at 80, 81 and 82. These have an advantage over cables in that they are not as likely to have any effective longitudinal elasticity within the power requirements of the machine. The bands will be anchored to the wheels and pulleys as indicated at 83 and 84, as may be done by screws and clips. Otherwise the mechanism will be the same. Strain gauges, one of which is shown at 85, may be applied to the bands if desired to measure finite variations due to temperature changes as may occur.

Modifications may be made in this invention without departing from the spirit of it. Different kinds of drives, as well as different kinds of clutches may be employed as the skilled worker in the art will readily note. The mechanism of the invention is of particular value in any circumstances where exactly controlled oscillatory, rotational or intermittent movement is to be applied to a driven member from a drive member, which has accurately controlled oscillatory or rotary movement, and especially where under these circumstances, there is to be an accurately controlled change in the mode of motion of the driven member as respects the drive member. The invention having been described in an exemplary embodiment, what is claimed as new and desired to be secured by Letters Patent is:

1. In a motion transmitting apparatus, the combination comprising:
    a first shaft and a second shaft;
    first, second, and third wheels non-rotatably mounted coaxially on said first shaft;
    a sleeve rotatably mounted coaxially on said second shaft;
    first and second pulleys rotatably mounted coaxially on said second shaft;
    a third pulley rotatably mounted coaxially on said sleeve;
    a first clutch interposed between said first pulley and said second shaft, said first clutch drivingly interconnecting said first pulley and said second shaft only when said first pulley is rotated in one direction;
    a second clutch interposed between said second pulley and said second shaft, said second clutch drivingly interconnecting said second pulley and said second shaft only when said second pulley is driven in said one direction;
    a third clutch interposed between said second pulley and said sleeve, said third clutch drivingly interconnecting said second pulley and said sleeve only when said second pulley is rotated in the opposite direction;
    a fourth clutch interposed between said third pulley and said sleeve, said fourth clutch drivingly interconnecting said third pulley and said sleeve only when said third pulley is rotated in said opposite direction;
    first drive means drivingly interconnecting said first pulley and said first wheel, whereby rotation of said first shaft in a given direction produces rotation of said first pulley in said one direction;
    second drive means drivingly interconnecting said second pulley and said second wheel, said second drive means being oppositely connected from said first drive means, whereby rotation of said first shaft in said given direction produces rotation of said second pulley in said opposite direction; and
    third drive means drivingly interconnecting said third pulley and said third wheel, said third drive means being connected to said third pulley to drive said third pulley in the same direction as said first pulley, whereby oscillatory rotation of said first shaft results in continuous rotation of said second shaft in one direction and continuous rotation of said sleeve in the opposite direction,
    said first, second and third drive means being chosen from a class consisting of belts, cables, and bands, each of said drive means being anchored both to its respective wheel and to its respective pulley.

2. The invention as defined in claim 1 wherein said second pulley is mounted intermediate said first and third pulleys and wherein said second pulley is provided with a first cup-shaped extension extending toward said first pulley and a second cup-shaped extension extending toward said third pulley, and wherein said first and third pulleys are each provided with a cup-shaped extension extending toward said second pulley; a first disk fixedly mounted coaxially on said shaft intermediate said first and second pulleys; a second disk fixedly mounted coaxially on said sleeve intermediate said second and third pulleys, said first and second clutch means being pivotally supported from said first disk, and said third and fourth clutch means being pivotally supported from said second disk.

References Cited in the file of this patent

UNITED STATES PATENTS

| | | |
|---|---|---|
| 134,820 | Shaw | Jan. 14, 1873 |
| 146,780 | Provancha | Jan. 27, 1874 |
| 189,926 | Du Brul | Apr. 24, 1877 |
| 593,290 | Bennett | Nov. 9, 1897 |
| 644,805 | McGee | Mar. 6, 1900 |
| 764,331 | Anthony | July 5, 1904 |
| 1,425,964 | Hinds | Aug. 15, 1922 |
| 1,459,573 | Cleveland | June 19, 1923 |
| 3,004,440 | Pernik | Oct. 17, 1961 |

FOREIGN PATENTS

| | | |
|---|---|---|
| 350,747 | France | Apr. 19, 1905 |